(12) United States Patent
Muller

(10) Patent No.: US 6,283,237 B1
(45) Date of Patent: Sep. 4, 2001

(54) METHOD AND APPARATUS FOR STEERING ARTICULATED MACHINES USING VARIABLE SPEED DEVICES

(75) Inventor: Thomas P. Muller, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/323,641

(22) Filed: Jun. 1, 1999

(51) Int. Cl.$^7$ ..................................................... B62D 11/04
(52) U.S. Cl. ..................... 180/6.48; 180/6.64; 180/235; 180/308
(58) Field of Search ................... 180/6.2, 6.44, 180/6.48, 6.5, 6.62, 6.64, 6.66, 235, 65.5, 65.3, 65.4, 308; 280/400; 477/1

(56) References Cited

U.S. PATENT DOCUMENTS

| | | | |
|---|---|---|---|
| 3,421,596 | * | 1/1969 | Christenson et al. . |
| 3,774,707 | | 11/1973 | Bridwell et al. ..................... 180/6.48 |
| 4,175,638 | | 11/1979 | Christensen ........................ 180/140 |
| 4,249,629 | * | 2/1981 | Hutt ..................................... 180/134 |
| 4,271,918 | * | 6/1981 | Molby ................................. 180/6.48 |
| 4,470,475 | * | 9/1984 | Carlson ............................... 180/6.48 |
| 4,486,694 | * | 12/1984 | Ohba et al. ......................... 318/587 |
| 4,579,181 | * | 4/1986 | Jarret et al. .......................... 180/6.5 |
| 4,728,923 | | 3/1988 | Finger ................................ 340/52 R |
| 4,893,689 | | 1/1990 | Laurich-Trost ..................... 180/140 |
| 5,022,476 | * | 6/1991 | Weege ................................. 180/6.5 |
| 5,194,851 | | 3/1993 | Kraning et al. ..................... 340/686 |
| 5,489,005 | * | 2/1996 | Marcott et al. ..................... 180/134 |
| 5,529,136 | * | 6/1996 | Zulu ................................... 180/6.44 |
| 5,555,949 | * | 9/1996 | Strallard et al. ...................... 180/6.5 |
| 5,698,956 | | 12/1997 | Nishino et al. ...................... 318/432 |
| 5,718,304 | | 2/1998 | Lee ...................................... 180/415 |
| 5,725,023 | | 3/1998 | Padula ............................. 137/596.17 |
| 5,739,657 | | 4/1998 | Takayama et al. .................. 318/587 |
| 6,039,133 | * | 3/2000 | Zulu . |

FOREIGN PATENT DOCUMENTS

| | | | |
|---|---|---|---|
| 42 19 876 A | * | 12/1992 | (DE) . |
| B 62 D 63/02 | * | 5/1997 | (DE) . |
| 0445933A1 | | 2/1991 | (EP) . |
| 1 008 507 A1 | * | 6/2000 | (EP) . |
| 2249289 | * | 5/1992 | (GB) . |

* cited by examiner

Primary Examiner—Paul N. Dickson
Assistant Examiner—Avraham H. Lerner
(74) Attorney, Agent, or Firm—Howard & Howard; Liza J. Meyers

(57) ABSTRACT

A steering system for turning a machine has a plurality of wheels that include a first and second wheel that share a first axis of rotation. The plurality of wheels also includes at least one tether wheel that has a second axis of rotation and may be pivoted relative to the first and second wheels. The first and second axes of rotation define a turning angle. A plurality of drive units include first and second drive units for independently rotating the first and second wheels respectively at variable speeds. A steering input device produces a steering input signal, and a controller receives the steering input signal and produces drive unit request signals to control the drive units. The drive unit request signals may command a turn by rotating the wheels at different speeds thereby altering the turning angle and turning the machine. In this manner, the present invention may steer the machine without articulation cylinders, a transmission, a drive shaft, or a differential.

8 Claims, 2 Drawing Sheets

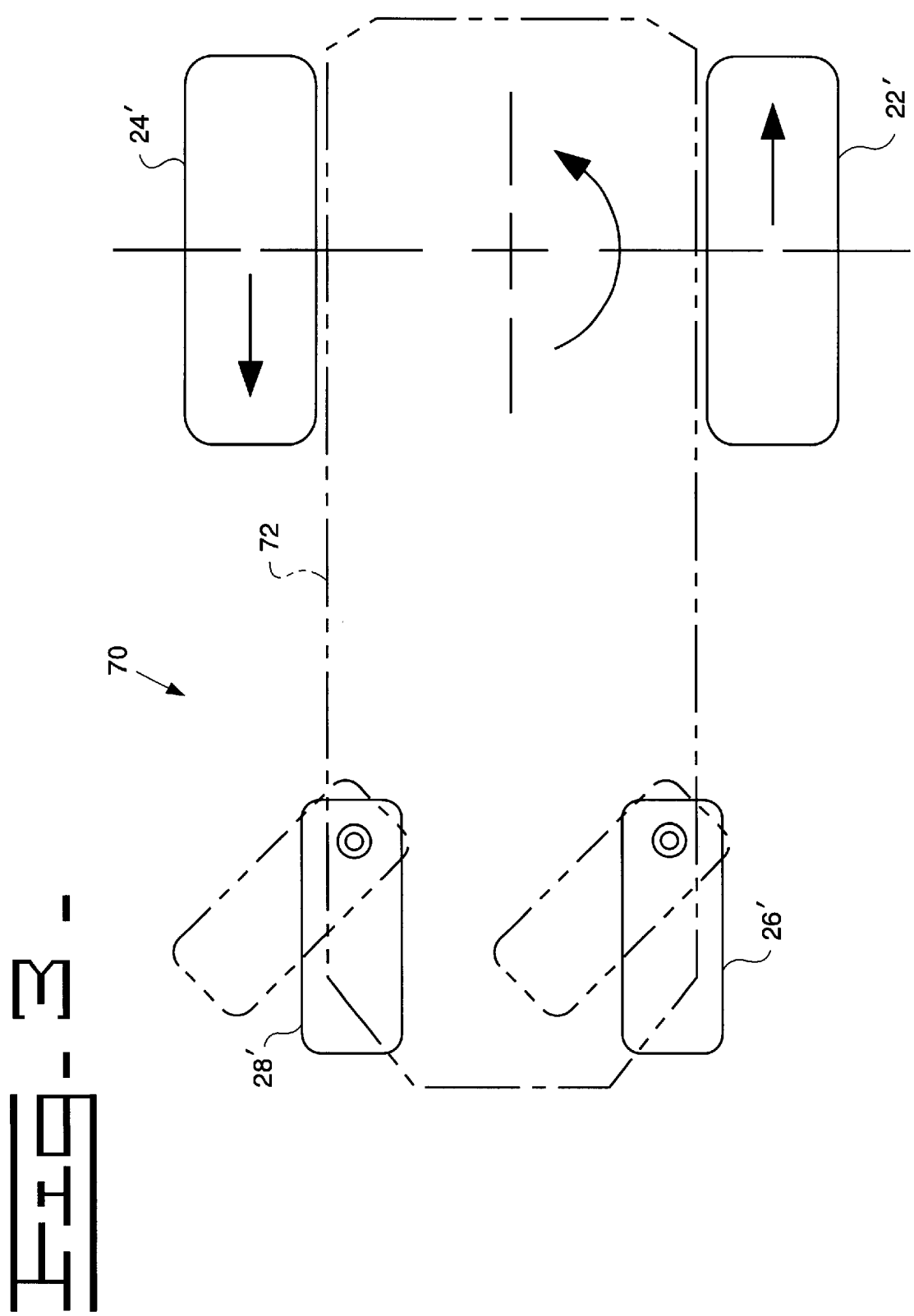

ately, a controller receives the
steering input signal, and a controller receives the
steering input signal and produces drive unit request signals
to control the drive units. The drive unit request signals may
command a turn by rotating the wheels at different speeds
thereby altering the turning angle and turning the machine.
In this manner, the present invention may steer the machine
without articulation cylinders, a transmission, a drive shaft,
or a differential.

In another aspect of the present invention a method for
turning a machine is provided. The method includes producing a steering input signal from a steering input device
representing a desired turning angle, and processing the
turning angle in a controller. The method further includes
producing a plurality of drive unit request signals from the
controller to control a plurality of independent drive units
for rotatingly driving a plurality of wheels, and rotatingly
driving the plurality of wheels at different speeds with the
plurality of drive units to steer the machine.

METHOD AND APPARATUS FOR STEERING ARTICULATED MACHINES USING VARIABLE SPEED DEVICES

TECHNICAL FIELD

This invention relates generally to a method and apparatus for steering an articulated machine and, more particularly, to a method and apparatus for utilizing independent variable speed devices to turn the articulated machine.

BACKGROUND ART

Various systems have been developed to steer a machine. One well known system is a rack and pinion system found in passenger vehicles. However, rack and pinion systems are not well suited for heavy machinery such as skidders, front loaders, scrapers, or articulated trucks. In these applications, the steered wheels may become ineffective in the soft earth. Articulated machines have been used as an alternative steering system.

Articulated machines have a front frame member, a rear frame member, and an articulation joint connecting the front and rear frame members. Typically, to steer an articulated machine, the front frame member must be rotated relative to the longitudinal axis of the rear frame member about the articulation joint while the machine is being propelled.

To rotate the front frame member, these machines commonly include articulation cylinders mounted between the frame members. The articulation cylinders are operated in opposite directions. That is, when one cylinder is extended forward, the other cylinder is retracted rearward and vice versa causing the front of the machine to face the intended turn.

Articulated machines are typically propelled by an internal combustion engine that drives the machine's wheels through a transmission, driveshaft, and differential. The machine is turned when the engine drives the wheels with the machine articulated by the hydraulic cylinders.

Prior alternatives have been developed to the prior articulated machine steering system described above. One such example is a machine utilizing skid steering. Skid steering machines are steered by driving the wheels on one side of the machine at a different rate of speed or direction than the wheels on the other side. For example, in such a steering system, the front wheels are not permitted to pivot relative to the rear wheels. As a result, several of the wheels are dragged, or "skidded," as the machine makes its turn since all of the wheels are not rotating at the same speed. Because the wheels are dragged, skid steering is typically limited to machines having a short wheel base and/or light weight.

Thus, it is desirable to provide an improved steering system for an articulated machine that overcomes the shortcomings of the prior art. The present invention is directed to overcoming one or more of the problems as set forth above.

DISCLOSURE OF THE INVENTION

In one aspect of the present invention a steering system for turning a machine is provided. The system has a plurality of wheels that include a first and second wheel that share a first axis of rotation. The plurality of wheels also includes at least one tether wheel that has a second axis of rotation and may be pivoted relative to the first and second wheels. The first and second axes of rotation define a turning angle. A plurality of drive units include first and second drive units for independently rotating the first and second wheels respectively at variable speeds. A steering input device

BRIEF DESCRIPTION OF THE DRAWINGS

FIG. 3 is an alternative embodiment of the present invention.

BEST MODE FOR CARRYING OUT THE INVENTION

Figure 1:
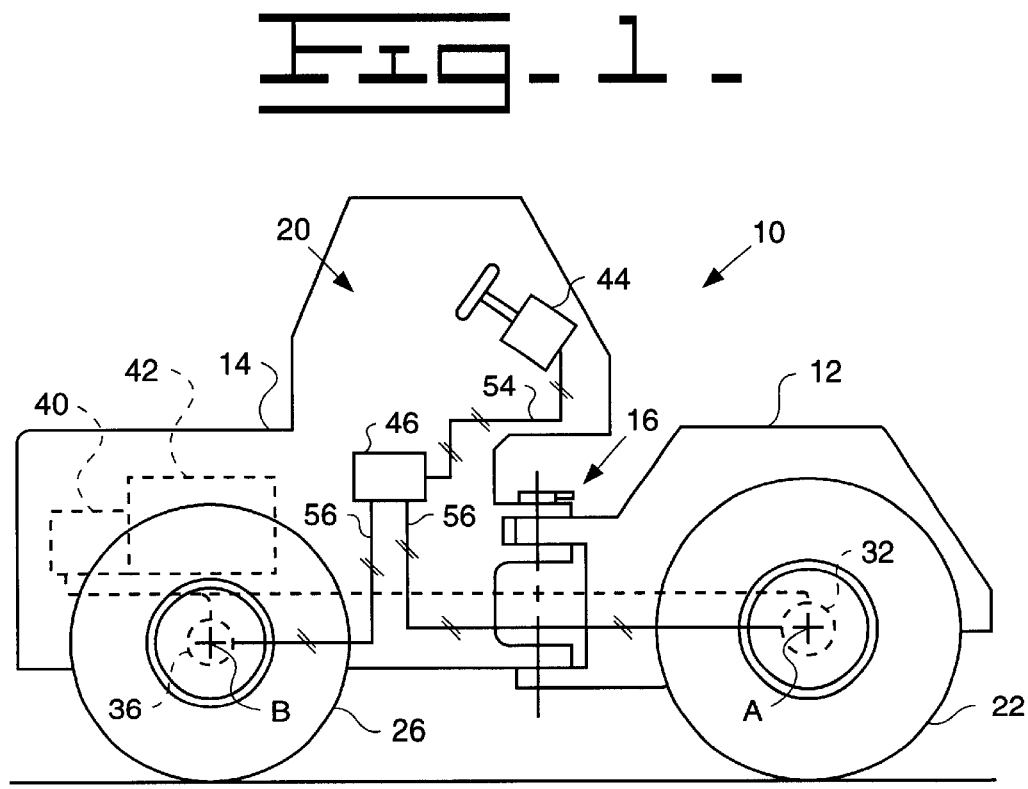
FIG. 1 is a schematic side view of an articulated machine.
Figure 2:
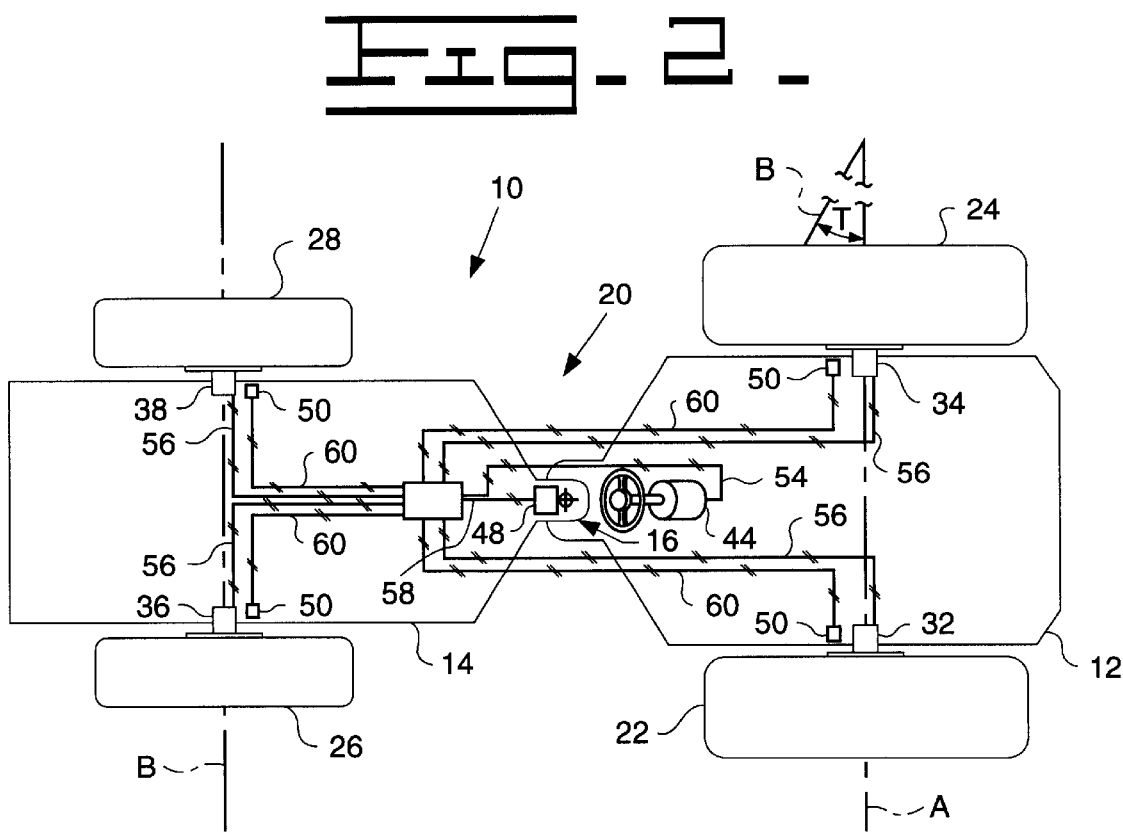
FIG. 2 is a schematic elevational view of the articulated machine shown in FIG. 1.

Referring to FIGS. 1 and 2, an articulated machine is shown generally at 10 and may be illustrative of such machines as a motor grader, truck, scraper, or forest machine, for example. The machine 10 includes a front frame 12 and a rear frame 14. The frames 12,14 are connected by an articulation joint 16 that permits the frames to move relative to one another. As discussed above, the articulation joint 16 better enables the machine 10 to make turns.

The machine 10 includes a steering system, shown generally at 20, for turning the machine 10. The system 20 has a plurality of wheels 22,24,26,28 that support the front 12 and rear 14 frames. First 22 and second 24 wheels are supported on the front frame 12 and share a first axis of rotation, A. The plurality of wheels also includes two tether wheels 26,28 supported on the rear frame 14 that has a second axis of rotation, B, and may be pivoted relative to the first 22 and second 24 wheels.

It is to be understood that by "tether" wheel it is meant to include any wheel that is passively pivotal relative to another wheel, similar to a caster relative to another wheel with a fixed axis. By passively pivotal it is meant that the tether wheel axis of rotation is not actively changed by a linkage such as a rack and pinion. Rather, the tether wheel axis of rotation pivots as the direction of the machine changes. That is, the tether wheels are simply pointed in the direction of the turn by the machine's movement.

As mentioned above, no devices are used to change the wheels' orientation relative to the supporting frame, as a rack and pinion system would. Further, no articulation cylinders are used to change the orientation of the rear wheels relative to the front wheels. Instead, the rear wheels simply follow the direction of the machine. For an articulated machine, the tether wheels are the rear wheels that are permitted to pivot in relation to the axis of the front wheels about the articulation joint. Of course, for smaller non-articulated machines, such as a forklift, it may be suitable to use either a single or a pair of caster-like wheels (best shown in FIG. 3), discussed more fully below.

The first and second axes of rotation, A and B, define a turning angle, T. In FIG. 2, a zero degree turning angle, T, is shown since the first and second axes, A and B, are parallel to one another. As the rear frame 14 pivots relative to the front frame 12 about the articulation joint 16, the turning angle, T, changes. During a wide turn, the turning angle, T, may only be a few degrees while during a sharp turn the turning angle, T, may be much larger.

The system 20 also has a plurality of drive units 32,34, 36,38 that include first 32 and second 34 drive units for independently rotating the first 22 and second 24 wheels respectively at variable speeds. The tether wheels 26,28 may also be driven by third 36 and fourth 38 drive units so that the machine is all-wheel drive.

The drive units 32,34,36,38 may be either hydraulic or electric motors coupled either to a hydraulic pump or generator, shown generally at 40. An internal combustion engine 42 powers the pump or generator 40.

The system 20 further includes a steering input device 44, a controller 46, an articulation sensor 48, and wheel speed sensors 50, all of which control the drive units 32,34,36,38 to effectuate a turn. However, it is to be understood that not all of the above devices are a necessary part of the present invention. For example, the speed sensors 50 may be eliminated if traction control is not a desired feature of the system 20. Further, additional control devices may be added to the system 20 to enhance its performance.

The steering input device 44 may be of any configuration, like the steering wheel shown or a joystick control. The steering input device 44 produces a steering input signal 54 that represents a desired turning angle, T.

The controller 46 receives and processes the steering input signal 54 and produces drive unit request signals 56 to control the drive units 32,34,36,38. The drive unit request signals 56 may command a turn by rotating the wheels at different speeds thereby altering the turning angle and turning the machine.

A left turn will be used to illustrate several ways in which the system 20 might effectuate a turn. The second wheel 24 may remain stationary while the first drive unit 32 rotates the wheels 22 thereby pivoting the machine 10 about the first wheel 24. Alternatively, the first 32 and second 34 drive units may drive the first 22 and second 24 wheels with the first unit 32 rotating at a more rapid rate of speed. The machine 10 may also make a left turn by having the second drive unit 34 rotate in a reverse direction while the first drive unit 32 rotates in a forward direction. Third 26 and fourth 28 drive units may also be employed to turn the machine 10. As the drive units are being actuated in the above manner, the rear frame 14 pivots about the articulation joint 16 and follows behind the front frame 12.

It should be appreciated from the above description that the need for articulation cylinders, a transmission, a driveshaft, and a differential has been eliminated.

The articulation sensor 48 may be used to indicate to the controller 46 when the desired turning angle, T, has been achieved. The articulation sensor 48 produces a turning angle signal 58 representing the actual turning angle, T. The controller 48 receives the turning angle signal 58 and alters the drive unit request signals 56 accordingly. That is, the drive unit request signals 56 may be altered to command an adjustment of the drive unit speeds if the desired turning angle, T, has already been achieved or if the desired turning angle, T, has not been achieved after a predetermined length of time.

The wheel speed sensors 50 may be used to provide more refined control of the drive units 32,34,36,38. As a wheel 22, 24, 26, 28 slips and loses traction, it may spin much faster than desired. To address this, the controller 46, which receives a signal from each wheel speed sensor 50, can determine which of the wheels 22, 24, 26, 28 is turning faster than the others, and can produce a drive unit request signal to slow the faster turning wheel to enable the freewheeling wheel to regain traction. However, if the articulated machine 10 is turning, the wheels 22, 24, 26, 28 will intentionally turn at different speeds. Consequently, the articulation sensor 48 enables the controller 46 to determine the desired relative speeds of the wheels 22, 24, 26, 28, and any wheel 22, 24, 26, 28 turning in marked excess of those speeds will be considered to be slipping. The controller 46 can then make the appropriate corrections. That is, the wheel speed sensors 50 and/or articulation sensor 48 is used as part of a traction control system that adjusts the drive units to accommodate for slipping wheels.

Turning now to FIG. 3, a highly maneuverable non-articulated machine is generally shown at 70. The machine 70 illustrates the applicability of the present invention to smaller machines such as a forklift. The steering input device, controller, drive units, and other components of the present invention system are not shown. First 22' and second 24' wheels are supported on the front of a frame 72 and are driven by drive units. Tether wheels 26', 28' are pivotally supported on the rear of the frame 72. The drive units may be operated in any of the manners described above. For example, using the configuration shown, the machine 70 may make very sharp turns by rotating the second wheel 24' in a reverse direction while the first wheel 22' is rotated in a forward direction. In this manner, a highly maneuverable steering system may be provided for short wheel base machines.

Industrial Applicability

This invention relates generally to a steering system 20 for an articulated machine 10 by utilizing independent variable speed devices. The system 20 has a plurality of wheels 22,24,26,28 that include a first 22 and second 24 wheel that share a first axis of rotation, A. The plurality of wheels 22,24,26,28 also includes at least one tether wheel 26,28 that has a second axis of rotation, B, and may be pivoted relative to the first 22 and second 24 wheels. The first and second axes of rotation, A and B, define a turning angle, T. A plurality of drive units 32,34,36,38 include first 32 and second 34 drive units for independently rotating the first 22 and second 24 wheels respectively at variable speeds. A steering input device 44 produces a steering input signal 54, and a controller 46 receives the steering input signal 54 and produces drive unit request signals 56 to control the drive units 32,34,36,38. The drive unit request signals 56 may command a turn by rotating the wheels 22,24,26,28 at different speeds and or directions thereby altering the turning angle, T, and turning the machine 10. In this manner, the present invention may steer the machine without articulation cylinders, a transmission, a drive shaft, or a differential.

Other aspects, objects, and features of the present invention can be obtained from a study of the drawings, the disclosure, and the appended claims.

What is claimed is:

1. A steering system for turning a machine comprising:
    a plurality of wheels including a first and second wheel sharing a first axis of rotation, said plurality of wheels including at least one tether wheel having a second axis of rotation;

a turning angle defined by said first and second axes of rotation;

a plurality of drive units including first and second drive units for independently rotating said first and second wheels respectively at variable speeds;

a steering input device for producing a steering input signal;

a controller for receiving said steering input signal and producing drive unit request signals to control said drive units by rotating said wheels at different speeds thereby altering said turning angle and turning the machine; and "front and rear frames connected by an articulation joint, said first and second wheels being supported on said front frame and said at least one tether wheel being supported on said rear frame, wherein said turning angle is altered when said front frame pivots relative to said rear frame about said articulation joint,".

2. A steering system as set forth in claim 1 further including an articulation sensor for producing a turning angle signal, wherein said controller receives said turning angle signal and alters said drive unit request signals accordingly.

3. A steering system as set forth in claim 2 further including a plurality of wheel speed sensors for producing a plurality of wheel speed signals, wherein said controller receives said wheel speed signals and alters said drive unit request signals accordingly.

4. A steering system as set forth in claim 1 wherein the number of said at least one tether wheel is two.

5. A steering system as set forth in claim 4 wherein said tether wheels are driven by third and fourth drive units.

6. A steering system as set forth in claim 1 further including a hydraulic pump driven by an engine, said drive units being hydraulic motors which are fluidly coupled to said hydraulic pump.

7. A steering system as set forth in claim 1 further including a generator driven by an engine, said drive units being electric motors which are electrically coupled to said generator.

8. A steering system as set forth in claim 1 wherein one of said first and second drive units rotate in a reverse direction and the other of said first and second drive units rotate in a forward direction to turn the machine.

* * * * *